(12) United States Patent
McCormick, Jr. et al.

(10) Patent No.: US 6,516,388 B1
(45) Date of Patent: Feb. 4, 2003

(54) METHOD AND APPARATUS FOR REDUCING CACHE POLLUTION

(75) Inventors: James E. McCormick, Jr., Fort Collins, CO (US); Stephen R. Undy, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 129 days.

(21) Appl. No.: 09/662,295

(22) Filed: Sep. 15, 2000

(51) Int. Cl.[7] .............................................. G06F 12/02
(52) U.S. Cl. ...................................... 711/136; 711/128
(58) Field of Search ................................ 711/122, 134, 711/136, 128

(56) References Cited

U.S. PATENT DOCUMENTS

| | | | |
|---|---|---|---|
| 5,473,764 A | * 12/1995 | Chi ............................. | 712/207 |
| 5,594,885 A | * 1/1997 | Lautzenheiser ............. | 711/118 |
| 5,859,999 A | 1/1999 | Morris et al. ............... | 395/565 |
| 5,860,017 A | 1/1999 | Sharangpani et al. ..   | 395/800.23 |
| 6,292,871 B1 | * 9/2001 | Fuente ........................ | 711/128 |
| 6,360,299 B1 | * 3/2002 | Arimilli et al. ............. | 711/118 |

OTHER PUBLICATIONS

"Patents shed light on Merced" by Alexander Wolfe, Electronic Engineering Times, Feb. 15, 1999, pp. 43 and 44.

* cited by examiner

*Primary Examiner*—Hiep T. Nguyen

(57) ABSTRACT

In a cache which writes new data over less recently used data, methods and apparatus which dispense with the convention of marking new cache data as most recently used. Instead, non-referenced data is marked as less recently used when it is written into a cache, and referenced data is marked as more recently used when it is written into a cache. Referenced data may correspond to fetch data, and non-referenced data may correspond to prefetch data. Upon fetch of a data value from the cache, its use status may be updated to more recently used. The methods and apparatus have the affect of preserving (n−1)/n of a cache's entries for the storage of fetch data, while limiting the storage of prefetch data to 1/n of a cache's entries. Pollution which results from unneeded prefetch data is therefore limited to 1/n of the cache. In reality, however, pollution from unneeded prefetch data will be significantly less, as many prefetch data values will ultimately be fetched prior to their overwrite with new data, and upon their fetch, their use status can be upgraded to most recently used, thus ensuring their continued maintenance in the cache.

20 Claims, 5 Drawing Sheets

METHOD AND APPARATUS FOR REDUCING CACHE POLLUTION

FIELD OF THE INVENTION

The invention pertains to the storage of data in a cache, and more particularly, to the reduction of cache pollution. Cache pollution is defined herein as 1) the overwrite of data that is more likely to be fetched from a cache with data that is less likely to be fetched from a cache, and 2) the preservation of data in a cache, which data is unlikely to be reused in the near future.

Note that the word "data" is used herein in two senses. In one sense, it is used to refer to specific data values which are to be added, shifted, or otherwise consumed by a functional unit of a computer. In another sense, "data" is used to generically refer to both specific data values which are consumed, and/or instructions which are executed, by a functional unit of a computer. In the preceding paragraph, the word "data" is used in its generic sense.

BACKGROUND OF THE INVENTION

Most modern computer systems comprise a number of functional units 104 and a memory hierarchy 102. The functional units, in combination with a portion of the memory hierarchy 106, 108, and control logic for transferring instructions and data between the functional units and memory hierarchy, form a central processing unit (or "processor" 100). See FIG. 1. Functional units may comprise integer processing units, floating-point processing units, branch target adders, instruction fetch units, data fetch units, and so on.

The speed at which the processor can consume instructions and data is largely dependent upon the rate at which instructions and data can be transferred between the functional units and the memory hierarchy. In an attempt to increase these transfer rates, many computer systems employ a hierarchy of memory caches 106, 108.

A cache is simply a small, high-speed buffer memory which is used to temporarily hold those portions of the contents of main memory 110 which it is believed will be consumed in the near future by a processor's functional units. The main purpose of a cache is to shorten the time necessary to perform memory accesses, either for instruction or data fetch. Information stored in cache memory may be accessed in much less time than information located in main memory. Thus, a processor with a cache memory needs to spend far less time waiting for instructions and data to be fetched and/or stored. In a cache hierarchy, lower level caches typically store increasingly smaller subsets of the instructions and data which are stored in main memory and/or higher level caches. However, lower level caches also tend to provide fetched instructions and data to functional units at an increasingly faster rate.

Since instructions and data are retrieved from a cache much more quickly than they are retrieved from main memory, it is desirable to keep caches filled with the instructions and data which functional units are likely to consume next. To achieve this goal, some processors fetch instructions and data speculatively. That is, they will predict the outcomes of conditional instructions (e.g., branch instructions) and fetch instructions and data from target code sections. If the execution of a conditional instruction is predicted to result in a first outcome, a target code section might be synonymous with a sequential code section. If the execution of a conditional instruction is predicted to result in a second outcome, branching to a target code section might require a redirection of program flow so that instructions and data are fetched from a non-sequential code section.

Instructions and data which are retrieved from memory as a result of the predicted program flow described in the preceding paragraph are known as "fetch" data. However, additional instructions and data are sometimes retrieved from memory. These additional instructions and data are known as "prefetch" data. Prefetch data may comprise 1) instructions and data retrieved from an alternate program flow path, 2) instructions and data which an instruction explicitly asks hardware to load into a cache, and 3) instructions and data whose retrieval are triggered by a hint which is encoded in an instruction.

While some caches only store fetch data, other caches store both fetch and prefetch data. When a cache stores prefetch data, it is possible that some of the prefetch data will never be consumed by a functional unit. The storage of unneeded prefetch data in a cache is referred to as "cache pollution" (and is sometimes referred to herein as "prefetch pollution"). Cache pollution also results from the continued storage of fetch data in a cache, long after a current need for the data has passed. This second form of cache pollution is sometimes referred to herein as "fetch pollution".

A number of methods have been devised to reduce cache pollution. One method involves writing new cache data over least recently used cache data. A least recently used (LRU) replacement algorithm therefore requires the tracking of data usage. Although numerous LRU-based algorithms exist, a true LRU algorithm simply ranks the temporal use order of data values stored in a cache. In an n-way, set-associative cache, for example, the data values in each indexed set of data values can be ranked from most to least recently used. When a new data value is written into such a cache, it will typically 1) overwrite the least recently used data value in a set of data values, and 2) be ranked as the most recently used data value in the set. The use rankings of other data values in the set are then downgraded accordingly.

If a cache stores both fetch and prefetch data, the use of an LRU-based based algorithm to store data in the cache can be problematic. Although the use of an LRU-based algorithm tends to alleviate pollution due to the storage of stale fetch data, the use of such an algorithm can sometimes overpopulate a cache's data entries with prefetch data, and thus increase prefetch cache pollution.

Another method for reducing cache pollution, and a method which alleviates both fetch and prefetch cache pollution, is to implement an LRU-based algorithm for data storage, but to only store fetch data in a cache 202. Such a solution can be implemented by storing fetch and prefetch data retrieved from a higher level memory 208 in a buffer 204, and then performing writes of data from the buffer to the cache. See FIG. 2. Fetch data can be written from the buffer to the cache at any time (e.g., when cache fill port bandwidth so permits). If data is allowed to be fetched from the buffer, thus bypassing the cache, then provisions can be made for upgrading the status of this data to "fetched", and also writing this data into the cache.

To assist in determining which data values should be written from the buffer to the cache, data can be stored in the buffer with a reference status (e.g., a single reference bit). A reference bit can be set to a first value to indicate that a data value stored in the buffer has been fetched—either prior to storage in the buffer, or subsequently. Likewise, a reference bit can be set to a second value to indicate that a data value stored in the buffer has only been prefetched. Since a reference bit is used to determine which data values are written into the cache, fetch data values which are written from the buffer to the cache will be referred to herein as "referenced" data values, and all other data values which are written from the buffer to the cache will be referred to as "non-referenced" data values.

Typically, the buffer which is used in the above method is small (perhaps on the order of eight entries). If the buffer is too large, it becomes similar to the cache, and some of its usefulness and efficiencies are lost. However, the small size of the buffer can also be problematic. If non-polluting prefetches are issued far in advance of fetches, or if many polluting prefetches are issued, the capacity of the buffer can quickly be exceeded, and useful prefetch data can be lost. Thus, the buffer reduces pollution in the cache, but at the risk of losing a greater percentage of prefetch data due to data overwrites. As is known in the art, the re-fetch of a data value from a higher level cache (or main memory) can be costly with respect to both timing and resource usage (e.g., a read port on the higher level cache, and all of the busses and other resources betweeen the higher level cache and a stalled pipeline often need to be used). A need therefore exists for better methods and apparatus for reducing cache pollution, which methods are less likely to result in a loss of prefetch data.

SUMMARY OF THE INVENTION

In accordance with the invention, methods and apparatus for reducing cache pollution while attempting to preserve both fetch and prefetch data in a cache are disclosed herein.

By way of example, a first preferred method for reducing cache pollution comprises marking non-referenced data as less recently used when it is written into a cache, and marking referenced data as more recently used when it is written into a cache. Upon subsequent fetch of a data value from the cache, its use status may be updated to more recently used. When new data is written into the cache, the new data is written over data which is marked as less recently used.

In summary, the above-described method dispenses with the LRU convention of always marking new cache data as most recently used. Instead, new fetch data is marked as more recently used (and in most cases will be marked as most recently used). However, new prefetch data is marked as less recently used (and in most cases will be marked as least recently used). In an n-way, set-associative cache, this has the affect of preserving (n−1)/n of the cache's entries for the storage of fetch data, while limiting the storage of prefetch data to 1/n of the cache's entries. Pollution which might result from unneeded prefetch data is therefore limited to 1/n of the cache. In reality, however, pollution from unneeded prefetch data will be significantly less, as many prefetch data values will ultimately be fetched prior to their overwrite with new data, and upon their fetch, their use status can be upgraded to most recently used, thus ensuring their continued maintenance in the cache.

Also by way of example, a first preferred embodiment of a pollution reducing cache structure for implementing the above method might comprise a number of data entries, a number of temporal use entries, a means for updating a temporal use entry upon the write of data into a corresponding data entry, and a means for 1) reading at least one temporal use entry from the cache during a write operation, 2) identifying a data entry which the at least one temporal use entry has marked as less recently used, and 3) causing new data to be written into the identified data entry. The means for updating a temporal use entry upon the write of data into a data entry preferably 1) marks non-referenced data as less recently used, and 2) marks referenced data as more recently used. In a preferred embodiment of the invention, a buffer which in part serves as an interface between a higher level memory and the cache, is used to mark data as referenced or non-referenced. However, data's fetch/prefetch status (or referenced/non-referenced status) may be tracked in a variety of ways, as is known by those skilled in the art.

As previously mentioned, referenced data is data that has been fetched because a functional unit needs the data, and non-referenced data is data that has only been prefetched.

The above described cache structure requires little additional supporting logic over prior art cache structures, yet serves to further reduce cache pollution while ensuring that needed data is maintained in the cache.

These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 3:
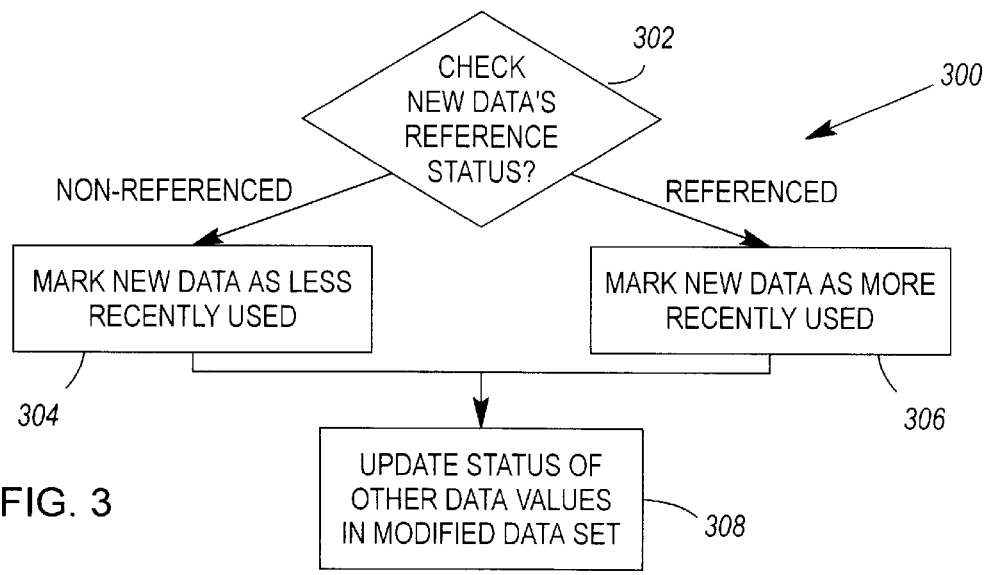
FIG. 3 illustrates a method for reducing cache pollution.

FIG. 3 illustrates a preferred method 300 for reducing cache pollution. The method 300 comprises marking non-referenced data as less recently used 302, 304 when it is written into a cache, and marking referenced data as more recently used 302, 306 when it is written into a cache. If a new data value is written into one entry of a "set" of data entries in an n-way, set-associative cache, then the use statuses of other data values in the modified data set may also need to be updated 308. Upon fetch of a data value from the cache, its use status is updated to more recently used. When new data is written into the cache, the new data is written over data which is marked as less recently used. Note that the word data is used in this Description in a generic sense, referring to both data (i.e., specific data values) and instructions.

The above method 300 has the affect of preserving (n−1)/n of a cache's entries for the storage of fetch data, while limiting the storage of prefetch data to 1/n of the cache's entries. Pollution which results from unneeded prefetch data is therefore limited to 1/n of the cache. In reality, however, pollution from unneeded prefetch data will be significantly less, as many prefetch data values will ultimately be fetched prior to their overwrite with new data, and upon their fetch, their use statuses can be upgraded to most recently used, thus ensuring their continued maintenance in the cache.

Figure 1:
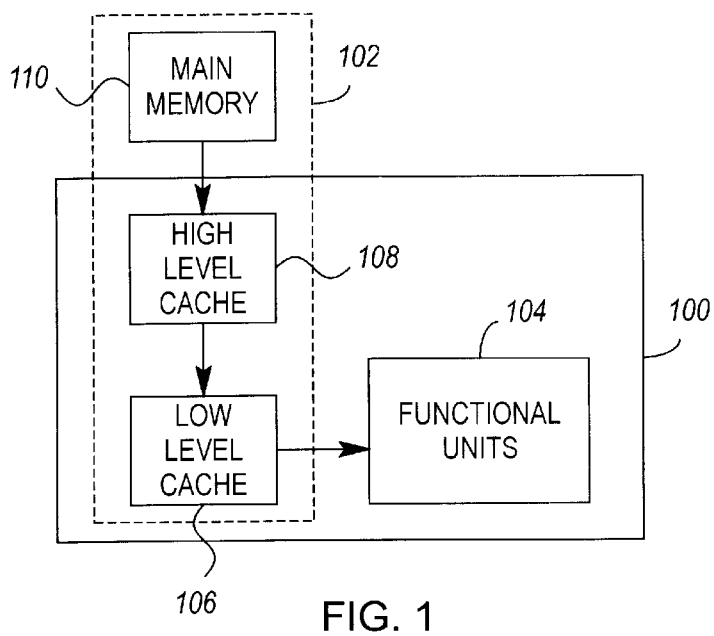
FIG. 1 illustrates an exemplary computer processor and computer memory hierarchy.
Figure 2:
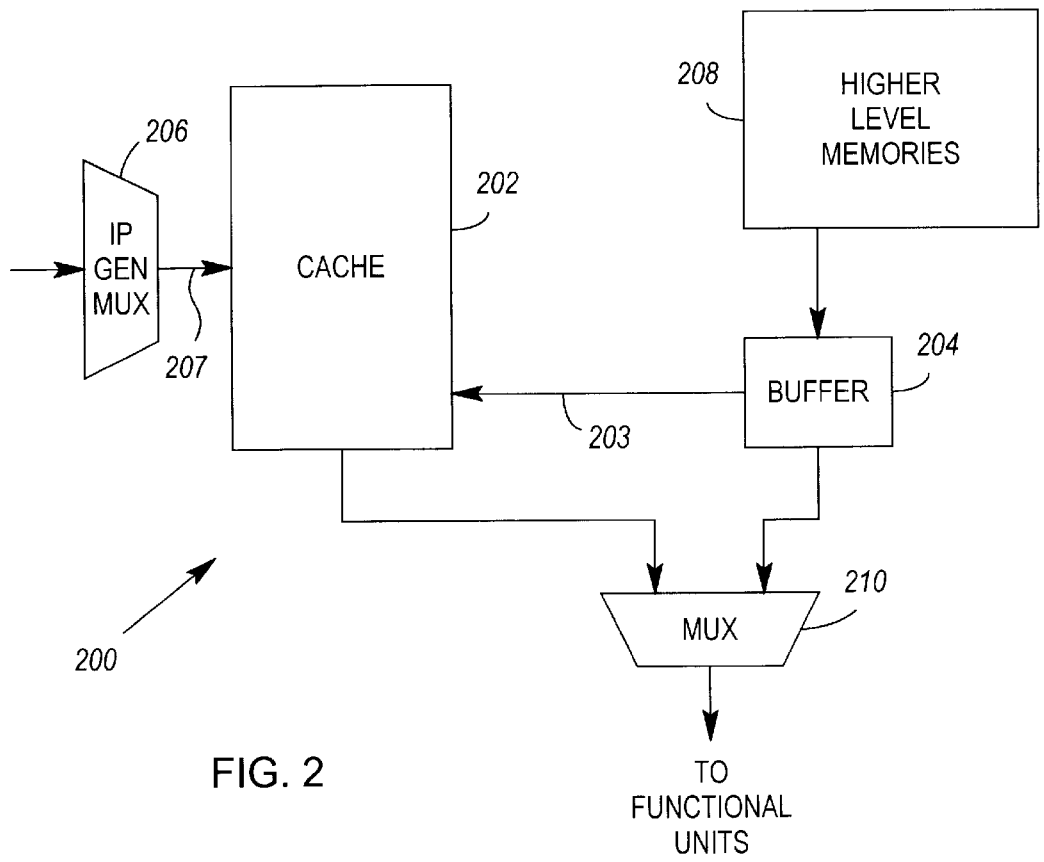
FIG. 2 illustrates a preferred embodiment of a cache structure which reduces cache pollution.

A preferred embodiment of a pollution reducing cache structure 200 for implementing the above method 300 is illustrated in FIG. 2. The cache structure 200 generally comprises a cache 202 and a buffer 204. Although the cache 202 may be implemented in a variety of ways, it preferably comprises a number of data entries 502, 504, 506, 508 and a number of temporal use entries 518. If the cache 202 is implemented as an n-way, set-associative cache (see FIG. 3), the data entries 502-508 may be divided among the cache's n way arrays 510, 512, 514, 516. The temporal use entries 518 (sometimes referred to herein as "data status entries") may be maintained within the way arrays 510–516, or more preferably, in a distinct data status array 520.

The exemplary cache 202 which is illustrated in FIG. 2 is shown to be an instruction cache, and as such, may be addressed by the value of an instruction pointer (IP) 207 when instructions are fetched from the cache 202. Alternatively, the cache 202 may be addressed by an address 402 provided over bus 203 by buffer 204 when new data 400 is written into the cache 202. The IP value 207 is derived from an IP generator multiplexer 206 (IP GEN MUX), which multiplexer 206 may receive a variety of inputs and controls for the purpose of generating an appropriate IP value 207. One skilled in the art will readily appreciate that the FIG. 2 cache structure 200 can be modified for data storage, or mixed instruction and data storage, without departing from the principles of the invention.

The buffer 204 serves, in part, as an interface between higher level memories 208 (e.g., higher level caches) and the cache 202. However, the buffer 204 may also serve other purposes. For example, if a functional unit has stalled pending the arrival of fetched data, it might be desirable to bypass the fetched data directly to the functional unit without first storing the fetched data in the cache 202. In this manner, data may be provided to a functional unit without incurring the read/write delays which are imposed by the cache 202. If provisions are made for fetching data from the buffer 204, a multiplexer 210 may be used to alternately provide data to a functional unit from either the cache 202 or the buffer 204.

It is important to note that the buffer 204 is not a necessary part of the invention, and it may not be needed if some other means of marking instructions and/or data as "referenced" or "non-referenced" is provided. For example, an instruction fetch unit might generate a bit which is indicative of the fetch/prefetch status of an instruction, and this bit might be routed to a que which is synchronized with fetched/prefetched instructions.

Figure 4:
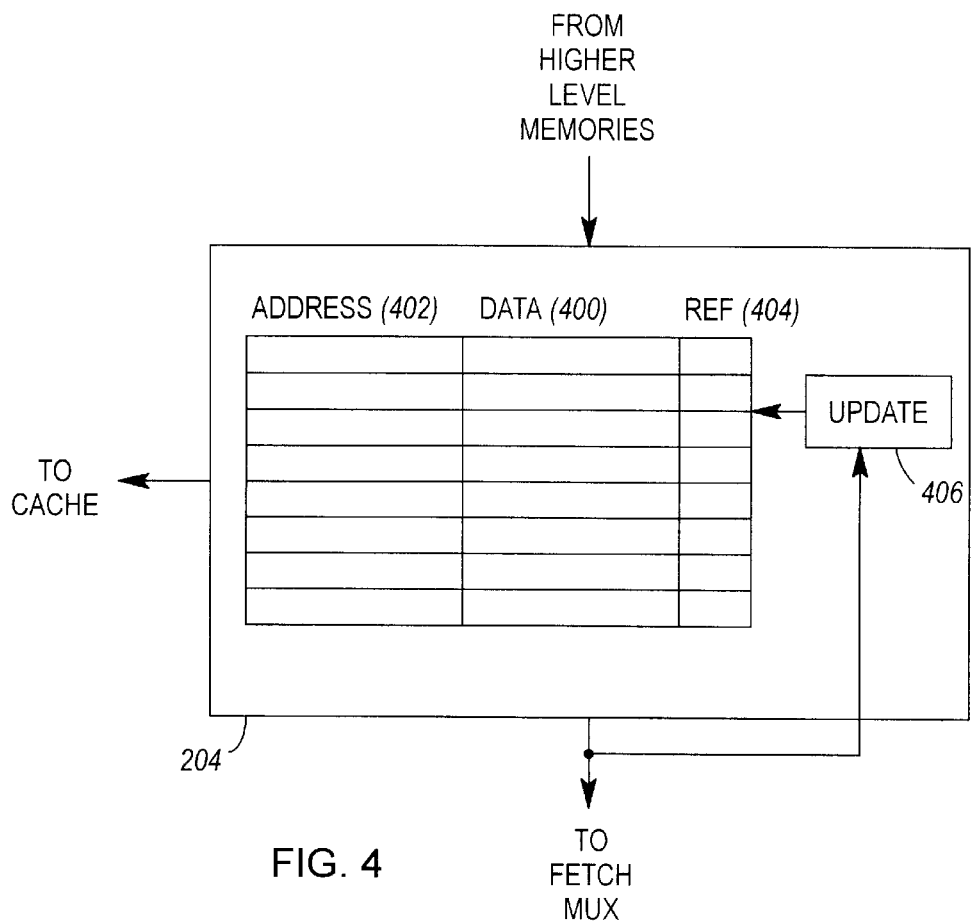
FIG. 4 illustrates an exemplary embodiment of the FIG. 2 buffer.

FIG. 4 illustrates a preferred embodiment of the FIG. 2 buffer 204. In one embodiment, the buffer 204 may comprise a table of data values 400, memory addresses 402, and reference statuses 404 (e.g., reference bits). Each data value 400 is associated with a corresponding address 402 and reference status 404. A data value's reference status 404 is used to track its fetch/prefetch status. Thus, for example, a reference bit 404 may be set to a first state (e.g., a logic "1" or "referenced" state) if a data value 400 is written into the buffer 204 as a result of the data 400 being fetched from a higher level memory 208. Likewise, a reference bit 404 may be set to a second state (e.g., a logic "0" or "non-referenced" state) if a data value 400 is written into the buffer 204 as a result of the data 400 being prefetched from a higher level memory 208. If data which has already been prefetched is subsequently fetched, and the data resides in the buffer 204 but not in the cache 202, then the data may be fetched directly from the buffer 204. Upon such a fetch, update logic 408 may be used to update the data value's reference bit to reflect a "referenced" (i.e., fetched) status.

Alternatively, a reference bit 404 stored in the buffer 204 may be initialized to a first state (e.g., a logic "0"), and then updated to a second state (e.g., a logic "1") if a data value (e.g., an instruction) is fetched from the buffer 204.

Although a variety of considerations may influence the timing of when data is written from the buffer 204 to the cache 202, such writes will preferably occur as soon as possible, and/or when cache fill port bandwidth so permits. If the buffer 204 overflows, needed instructions can be lost, and the lost instructions then need to be refetched while a pipeline is stalled. As is known in the art, bus control logic may be provided for managing the use of the bus 203 which couples the buffer 204 to the cache 202.

Figure 5:
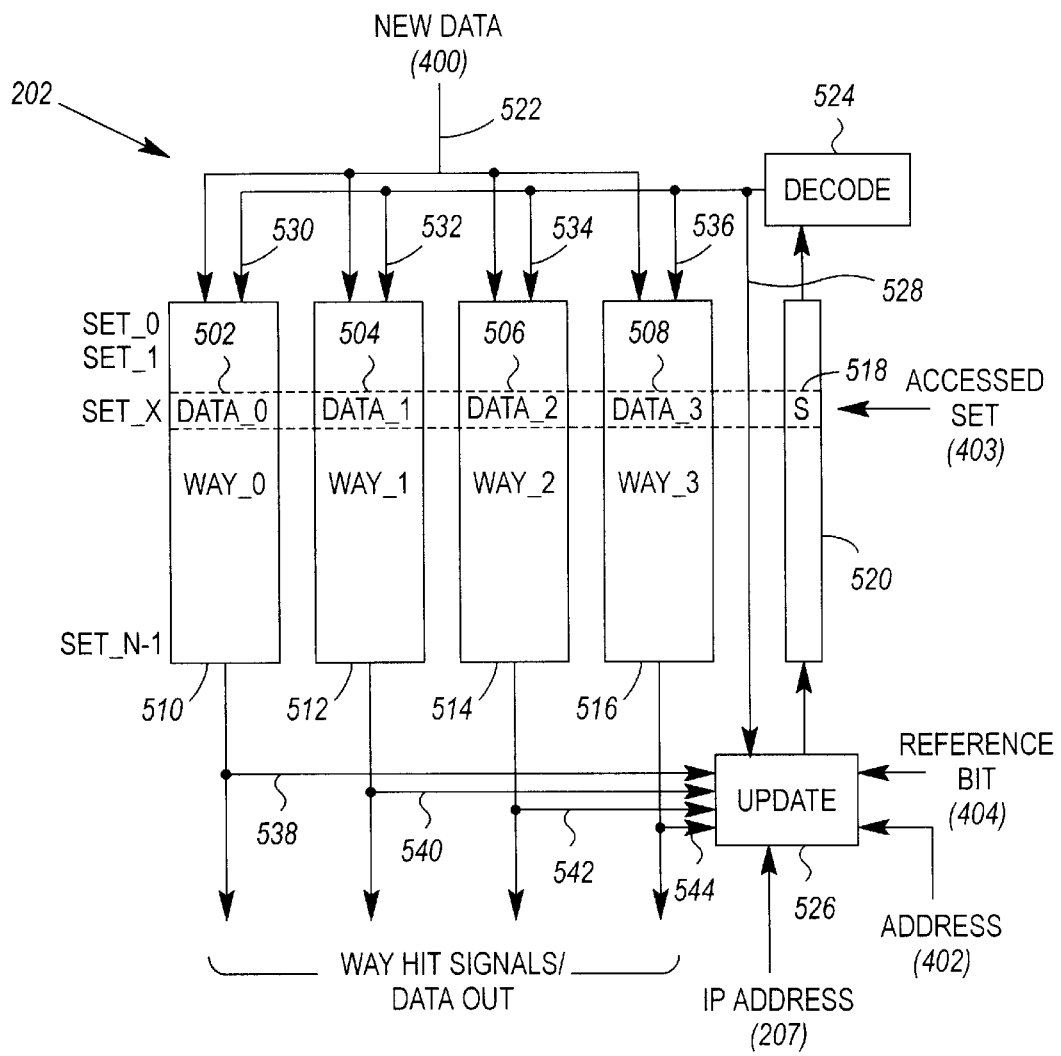
FIG. 5 illustrates an exemplary embodiment of the FIG. 2 cache.

FIG. 5 illustrates a preferred embodiment of the FIG. 2 cache 202. The cache 202 is illustrated as a 4-way, set-associative cache. In order to write a data value 400 from the buffer 204 to the cache 202, a set of data entries 502–508 in the cache 202 are indexed using all or part of the data value's address 402. A corresponding temporal use entry 518 is also addressed.

At or about the time an address 402 is presented to the cache 202, a corresponding data value 400 is presented to data inputs of each way array 510–516. The way into which the data value 400 is written is determined by the status of four enable lines 530, 532, 534, 536, only one of which is active during a cache write. The active enable line is determined by the value of a temporal use entry 518 which is decoded by decoder 524.

Preferably, each temporal use entry 518 specifies a temporal use order for its corresponding set of data entries 502–508. If each data value in a set of n data values 502–508 is assigned a unique use status, and one desires to track every possible order of use statuses for the n data values, a temporal use entry 518 might comprise, for example, $\log_2 n!$ bits, where n! (n factorial) is the number of different orders the n data values may assume. Thus, temporal use entry 518 in a 4-way set associative cache might comprise five bits. However, temporal use entries 518 may comprise other numbers of bits, depending on the method which is used to store the temporal use entries 518. Various data status storage methods will be explained in greater detail later in this Description.

Upon reading a bit pattern from a temporal use entry 518, the bit pattern can be decoded 524 to generate an enable signal on one of enable lines 530–534. If the cache 202 implements a true LRU algorithm, a bit pattern 518 may be decoded to ensure that new data is always written into the least recently used data value of an accessed data set 403. However, a cache 202 might also implement a "pseudo" least recently used algorithm where, for instance, each data value in a set of data values 403 is not assigned a unique use status. For example, two values in a set of four data values might be assigned the status of "more recently used", while the other two data values might be assigned the status of "less recently used". Note that such a pseudo-LRU algorithm might require the storage of fewer bits per temporal use entry 518, and thus reduce the size of a data status array 520 and cache 202. However, the use of such an algorithm also tends to mitigate some of the advantages of the novel pollution reducing techniques which are disclosed herein.

In accordance with the invention, it is preferable to write new cache data over least recently used cache data, but to not assign all new cache data values a status of "most recently used", as is typical of prior LRU-based algorithms. Rather, new data which is "referenced" is written into the cache 202 as most recently used (or at least more recently used), and new data which is "non-referenced" is written into the cache as least recently used (or at least less recently used).

To accomplish such a selective assignment of use statuses, the bit pattern which is read from the data status array 520 may be provided to update logic 526 via a bus 528. Upon a write of new data into the cache 202, the update logic 526 receives a corresponding reference bit 404 from the buffer 204, and uses this reference bit 404, in combination with 1) a data set's previous use status 518, and/or 2) an indication as to which data value in a set of addressed data values 502–508 the new data is to overwrite, to generate an updated use status. An updated use status is then stored back to the data status array 520.

Data use statuses are also updated when a data value is fetched from the cache 202. A use status may be updated, for example, by 1) providing way hit signals 538–544 to the use status update logic 526, 2) reading the use statuses 518 for the data set 502–508 which corresponds to a fetched data value, and then 3) generating a new use status for the accessed data set 502–508, wherein the new use status is a function of the way hit signals 538–544 and the accessed data set's previous use statuses 518.

Figure 7:
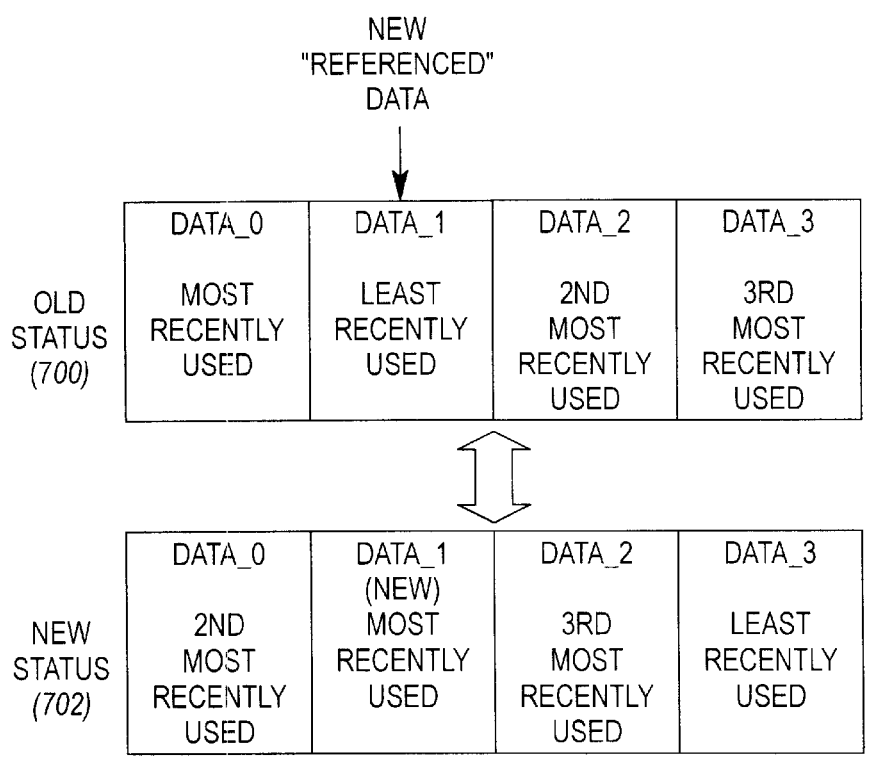
FIG. 7 illustrates the storage of referenced data in the FIG. 2 cache.
Figure 8:
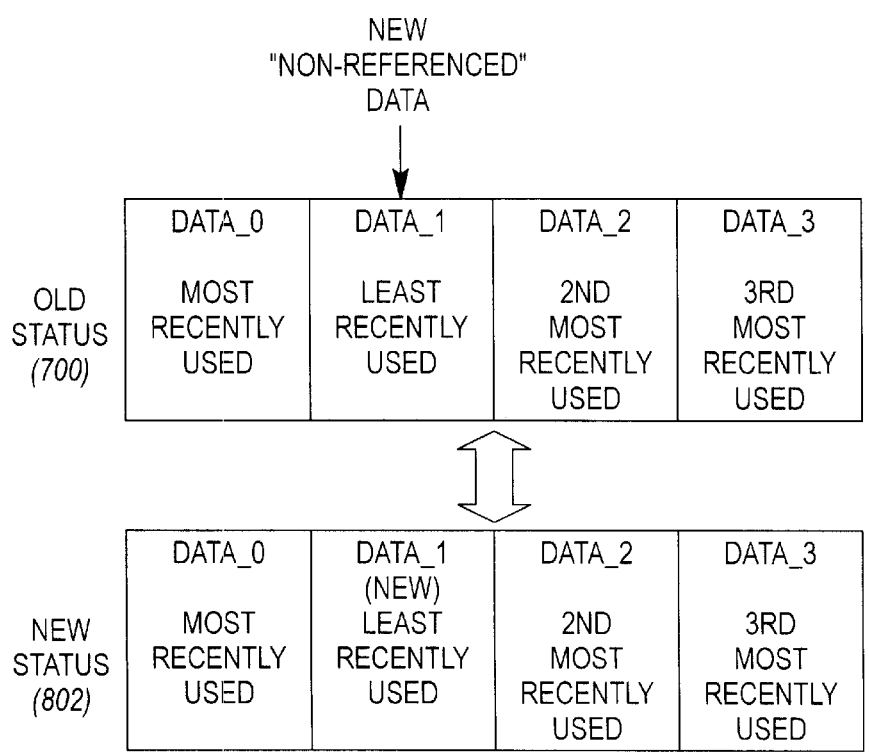
FIG. 8 illustrates the storage of non-referenced data in the FIG. 2 cache.

FIGS. 7 and 8 illustrate two exemplary use status updates. In FIG. 7, a set of four data entries contain data values having the respective use statuses (from left to right) of: most recently used, least recently used, second most recently used, and third most recently used (i.e., collectively, OLD STATUS 700). Upon the write of a new, "referenced" data value into this set of data values, the least recently used data value will be selected for overwrite. Once the overwrite has been completed (or as it is taking place), the pattern of use statuses 700 for the four data entries (from left to right) is updated to: second most recently used, most recently used, third most recently used, and least recently used (i.e., collectively, NEW STATUS 702).

In FIG. 8, a new, "non-referenced" data value is written into the same set of data values which initially appeared in FIG. 7. Once again, the least recently used data value will be selected for overwrite. However, once the overwrite has been completed (or as it is taking place), the pattern of use statuses for the four data entries (from left to right) remains: second most recently used, most recently used, third most recently used, and least recently used (i.e., collectively, NEW STATUS 802).

Given the scenarios set forth in FIGS. 7 and 8, one can appreciate that "referenced" data values are likely to be maintained in the cache 202 for an extended period of time, while "non-referenced" data values are likely to be overwritten with the next write of new data into a particular data set 502–508. If referenced data values correspond to fetch data, and non-referenced data values correspond to prefetch data, then fetch data is likely to be maintained in the cache 202, and prefetch data is likely to be overwritten. In fact, prefetch data will only be maintained in the cache 202 if it is fetched prior to the next write of new data into its data set 502–508.

One skilled in the art will appreciate that the temporal use entries 518 which are stored in the data status array 520 may be stored in a variety of alternative formats. One such format is disclosed in the U.S. Patent Application of Stephen R. Undy entitled "System for Write-only Least-recently-used Updates" Ser. No. 09/507,322, which is hereby incorporated by reference for all that it discloses. As disclosed in the patent application of Undy, each bit in a temporal use order bit pattern 518 may specify a temporal use relationship between two data values stored in a different two of a cache's n-ways. When temporal use order bit patterns 518 are stored in such a manner, status update logic 526 may update a bit pattern 518 when data is fetched from cache 202 without first needing to know the existing state of a bit pattern 518 which is to be updated.

Figure 6:
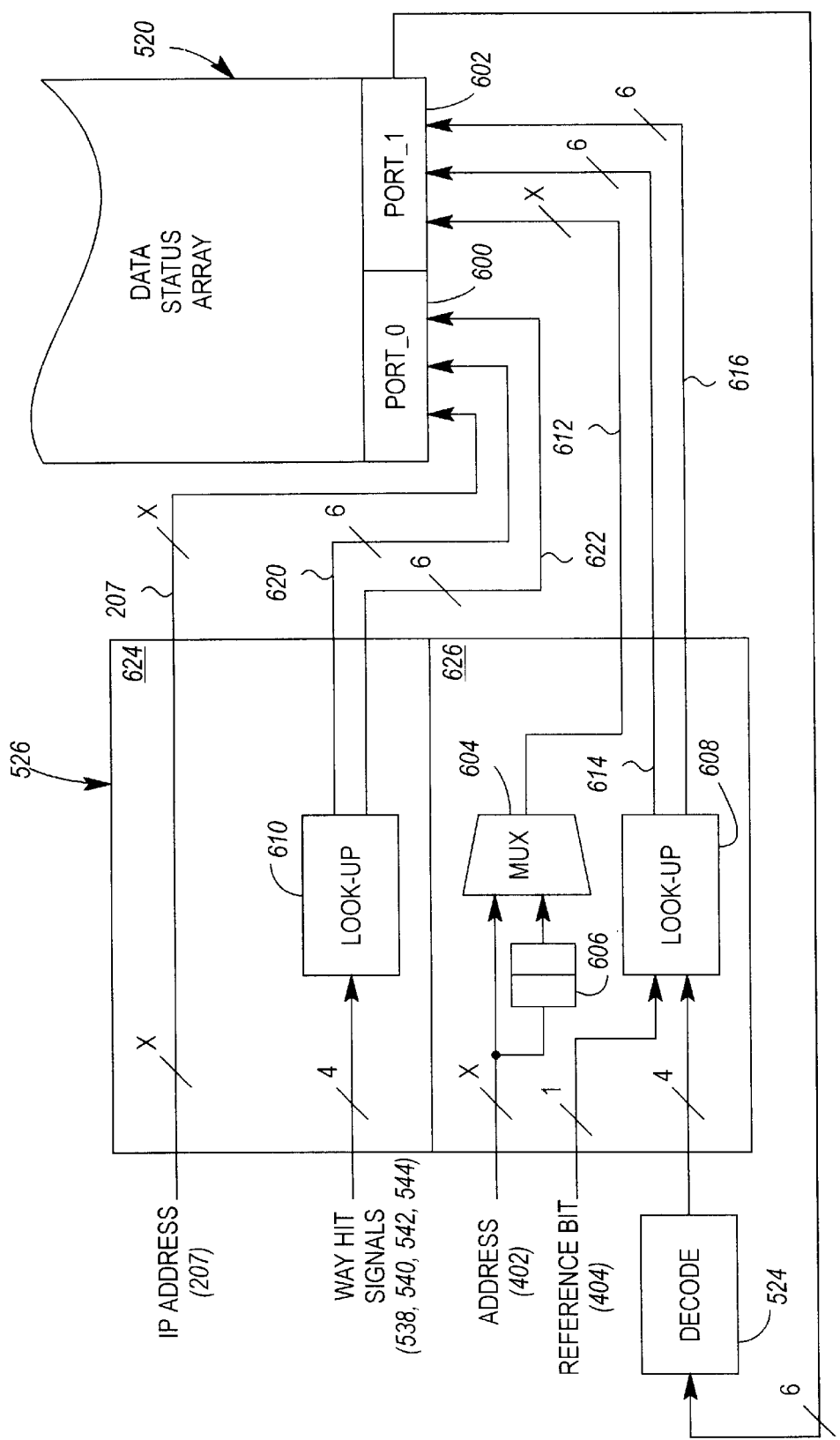
FIG. 6 illustrates an exemplary embodiment of the FIG. 5 update logic.

If the method of storing temporal use order bit patterns disclosed in the patent application of Undy is used to store data in data status array 520, then status update logic 526 may be configured as shown in FIG. 6. Note that the status update logic 526 is shown to comprise two portions 624, 626. A first portion 624 determines how the data status array 520 is updated upon a fetch of data from cache 202. The second portion 626 determines how the data status array 520 is updated upon a write of new data into the cache 202. Note also that the data status array 520 preferably comprises two ports (PORT_0 600 and PORT_1 602). In this manner, one temporal use entry may be updated in response to a fetch, while another temporal use entry may be read, decoded and updated in response to a write of new data into the cache 202.

Upon fetch of a data value from the cache 202, way hit signals 538–544 are provided to a table look-up device 610. The table look-up device 610 is used to generate a set of enable bits 620 (some of which will be asserted) and a new temporal use order 622. Each combination of way hit signals 538–544 which is presented to the table look-up device 610 generates a different subset of asserted enable bits 620, and each asserted enable bit enables a write of a different bit in a temporal use entry 518.

Only those bits of a temporal use order 622 which represent a possible change to a previous temporal use order 518 need be written to the data status array 520; and as described in the patent of Undy referred to supra, the assertion and de-assertion of appropriate enable bits 620 identifies which bits of a new temporal use order 622 might have changed. The value of an IP address 207 dictates which particular temporal use entry 518 in the data status array 520 will be updated by the update logic 526.

Upon the write of a new data value 400 into the cache 202, an addressed temporal use entry 518 is decoded 524 and input to a table look-up device 608 along with an appropriate reference bit 404. Together, the decoded temporal use order 518 and reference bit 404 are used to address a new temporal use order 616 and set of enable bits 614. New temporal use bits 616 are then written into an appropriately addressed entry of the data status array 520 in the same way that they are written into the data status array 520 following a data fetch (the difference being that PORT_1 is used for the write instead of PORT_0). In accordance with the invention, a temporal use entry 518 is updated to mark an accessed way as most recently used when the reference bit 404 which is supplied to the update logic 526 indicates that new cache data is "referenced" (i.e., the data has been fetched), or to mark an accessed way as least recently used when the reference bit 404 indicates that data is "non-referenced" (i.e., the data has only been prefetched).

Note that the address 612 which is supplied to PORT_1 is derived from a multiplexer 604 which receives addresses 402 from the buffer 204. The multiplexer 604, in conjunction with a queue 606 which is coupled to one input of the multiplexer 604, assists in managing reads and writes of the data status array 520 when reads and writes of the data status array 520 are performed in a pipelined fashion. Upon a write of new data 400 into the cache 202, a read of a data status 518 will typically need to be performed prior to an update of the data status 518. The read of the data status 518, may be performed by supplying an address 402 to the data status array 520 via the non-queued input of the multiplexer 604. During an update of the data status 518, an address may be provided to the data status array 520 via the queued input of the multiplexer.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for reducing cache pollution, comprising:
   a) marking non-referenced data as less recently used when it is written into a cache;
   b) marking referenced data as more recently used when it is written into the cache;
   c) upon fetch of a data value from the cache, updating its use status to more recently used; and
   d) when new data is written into the cache, writing new data over data which is marked as less recently used.

2. A method as in claim 1, wherein the non-referenced data is marked as least recently used when it is written into the cache, and the referenced data is marked as most recently used when it is written into the cache.

3. A method as in claim 1, wherein the new data is written over data marked as least recently used.

4. A method as in claim 1, further comprising:
   a) storing prefetch data in a buffer;
   b) initially marking prefetch data stored in the buffer as non-referenced;
   c) upon fetch of data from the buffer, marking the fetched data as referenced; and
   d) periodically writing data stored in the buffer into the cache.

5. A method as in claim 4, further comprising:
   a) storing fetch data in the buffer; and
   b) initially marking fetch data stored in the buffer as referenced.

6. A method as in claim 1, wherein the status of a data value which is fetched from the cache is updated to most recently used.

7. A method as in claim 6, wherein:
   a) the non-referenced data is marked as least recently used when it is written into the cache;
   b) the referenced data is marked as most recently used when it is written into the cache; and
   c) the new data is written over data marked as least recently used;
the method further comprising:
   d) storing fetch and prefetch data in a buffer;
   e) initially marking fetch data stored in the buffer as referenced;
   f) initially marking prefetch data stored in the buffer as non-referenced;
   g) upon fetch of data from the buffer, marking the fetched data as referenced; and
   h) periodically writing data stored in the buffer into the cache.

8. A pollution reducing cache structure, comprising:
   a) a cache comprising data entries and temporal use entries;
   b) means for updating at least one temporal use entry upon a write of data into a data entry, wherein the at least one temporal use entry is updated to:
      i) mark non-referenced data as less recently used; and
      ii) mark referenced data as more recently used; and
   c) means for reading a number of temporal use entries from the cache during a write operation, for identifying a data entry which is marked as less recently used by said number of temporal use entries, and for causing new data to be written into said identified data entry.

9. A pollution reducing cache structure as in claim 8, wherein:
   a) the cache is an n-way, set-associative cache; and
   b) one temporal use entry corresponds to each set of n data entries in the cache, wherein each temporal use entry specifies a pattern of more/less recently used statuses for a particular set of n data entries.

10. A pollution reducing cache structure as in claim 8, wherein:
    a) the cache is an n-way, set-associative cache; and
    b) one temporal use entry corresponds to each set of n data entries in the cache, wherein each bit of a particular temporal use entry specifies a temporal use relationship between two data values stored in a different two of the cache's n ways.

11. A pollution reducing cache structure as in claim 8, further comprising:
    a) a buffer;
    b) means for initially marking prefetch data stored in the buffer as non-referenced;
    c) means for marking data fetched from the buffer as referenced; and
    d) a bus for transferring data values and their corresponding reference statuses from the buffer to the cache.

12. A pollution reducing cache structure as in claim 11, further comprising means for initially marking fetch data stored in the buffer as referenced.

13. A pollution reducing cache, comprising:
    a) a plurality of data arrays and a data status array, wherein bit patterns stored in the data status array indicate a temporal use order of corresponding data values stored in the plurality of data arrays;
    b) logic which, upon a write of new data into the cache, addresses a bit pattern and its corresponding data values; and
    c) logic for updating said addressed bit pattern, said logic comprising:
       i) an input for receiving a reference status of said new data;
       ii) an input for receiving an indication as to which data value of said addressed data values said new data is to overwrite; and
       iii) an output which provides an updated bit pattern in response to the logic's inputs, wherein said updated bit pattern:
          A) marks said new data as being more recently used if said reference status is "referenced"; and
          B) marks said new data as being less recently used if said reference status is "non-referenced".

14. A pollution reducing cache as in claim 13, wherein:
    a) the cache is an n-way, set-associative cache; and b) each bit pattern corresponds to a set of n data entries in the cache.

15. A pollution reducing cache as in claim 14, wherein each bit in a particular bit pattern specifies a temporal use relationship between two data values stored in a different two of the cache's n-ways.

16. A pollution reducing cache as in claim 13, further comprising a number of enable lines coupled between the logic for updataing the addressed bit pattern and the data status array, wherein said logic for updating the addressed bit pattern asserts ones of the number of enable lines to update particular bits of said addressed bit pattern in a write-only fashion.

17. A pollution reducing cache as in claim 13, wherein the logic for updating the addressed bit pattern further comprises an input for receiving said addressed bit pattern.

18. A pollution reducing cache as in claim 13, wherein the cache is an instruction cache, and wherein each data value stored in the cache comprises one or more instructions.

19. A pollution reducing cache as in claim 13, wherein the output of the logic for updating the addressed bit pattern marks said new data as being most recently used if said reference status is "referenced", and marks said new data as being least recently used if said reference status is "non-referenced".

20. A pollution reducing cache as in claim 19, wherein:
a) the cache is an n-way, set-associative cache;
b) each bit pattern corresponds to a set of n data entries in the cache;
c) each bit in a particular bit pattern specifies a temporal use relationship between two data values stored in a different two of the cache's n-ways; and
d) the cache further comprises a number of enable lines coupled between the logic for updating the addressed bit pattern and the data status array, wherein said logic for updating the addressed bit pattern asserts ones of the number of enable lines to update particular bits of said addressed bit pattern in a write-only fashion.

* * * * *